US007962516B2

(12) United States Patent
Bahrs et al.

(10) Patent No.: US 7,962,516 B2
(45) Date of Patent: Jun. 14, 2011

(54) SYSTEM AND METHOD FOR ADDING MULTI-LEVEL SECURITY TO FEDERATED ASSET REPOSITORIES

(75) Inventors: Peter C. Bahrs, Georgetown, TX (US); Michael Jon Dockter, Wellington, FL (US); Enrique Vicente Kortright, Thibodaux, LA (US); Gregory Bruce Yarbrough, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/026,240

(22) Filed: Feb. 5, 2008

(65) Prior Publication Data

US 2009/0198698 A1  Aug. 6, 2009

(51) Int. Cl.
*G06F 17/30* (2006.01)
(52) U.S. Cl. .................................................... 707/783
(58) Field of Classification Search .................. 707/783
See application file for complete search history.

(56) References Cited

U.S. PATENT DOCUMENTS

| 5,894,554 | A  | 4/1999 | Lowery et al. | 395/200.33 |
| 6,324,539 | B1 | 11/2001 | Gebauer | 707/10 |
| 6,556,998 | B1 | 4/2003 | Mukherjee et al. | 707/10 |
| 6,658,400 | B2 | 12/2003 | Perell et al. | 707/1 |
| 6,698,021 | B1 | 2/2004 | Amini et al. | 725/105 |
| 7,130,852 | B2 | 10/2006 | Parent | 707/9 |
| 7,188,251 | B1 | 3/2007 | Slaughter et al. | 713/182 |
| 2004/0254863 | A1 | 12/2004 | Jones et al. | 705/29 |
| 2005/0223412 | A1* | 10/2005 | Nadalin et al. | 726/3 |
| 2006/0021019 | A1* | 1/2006 | Hinton et al. | 726/10 |
| 2007/0220268 | A1* | 9/2007 | Krishnaprasad et al. | 713/182 |

OTHER PUBLICATIONS

Kang et al., "Concurrency Control for Federated Multilevel Secure Database Systems," Computer Security Foundations Workshop, 1995, Proceedings., Eighth IEEE Jun. 13-15, 1995, pp. 118-135.
Oliva et al., "Maintaining the Confidentiality of Interoperable Databases with a Multilevel Federated Security System," IFIP Workshop on Database Security, 2001, pp. 269-282, url="citeseer.ist.psu.edu/oliva01maintaining.html".

\* cited by examiner

*Primary Examiner* — James Trujillo
*Assistant Examiner* — William Spieler
(74) *Attorney, Agent, or Firm* — VanLeeuwen & VanLeeuwen; Justin M. Dillon

(57) ABSTRACT

A system and method for adding multi-level security to federated asset repositories is provided. A multi-level security (MLS) manager receives normalized taxonomies from repository managers, which manage repositories that include assets assigned various security levels. In turn, the MLS manager integrates the taxonomies into a composite taxonomy. When a portal receives a request from a user, the portal sends a taxonomy request to the MLS manager that includes the user's user identifier. The MLS manager retrieves the composite taxonomy, identifies the user's security level, filters the composite taxonomy based upon the user's security level, and provides the filtered composite taxonomy to the portal. In turn, the portal generates a user interface view based upon the filtered composite taxonomy and provides the user interface view to the user, which utilizes the user interface view to request and receive access to assets from one or more federated repositories.

20 Claims, 10 Drawing Sheets

500

| Industry | | | |
|---|---|---|---|
| | Cross Industry | | |
| | Distribution | | |
| | | Distribution Industry Guidelines | |
| | | Consumer Products | |
| | | Retail | |
| | | Travel and Transportation | |
| | | Wholesale Distribution | |
| | | | Wholesale Industry Reference Architecture |
| | Communication | | |
| | | Media and Entertainment | |
| | | Telecommunications | |
| | | Energy and Utilities | |
| | Industrial | | |
| | | Aerospace and Defense | — 540      — 540 |
| | | | F-4 SOA Blueprint |
| | | Automotive | — 410 |
| | | Chemical and Petroleum | — 420 |
| | | Electronics | — 430 |
| | | Engineering | — 440 |

*FIG. 5*

SYSTEM AND METHOD FOR ADDING MULTI-LEVEL SECURITY TO FEDERATED ASSET REPOSITORIES

BACKGROUND OF THE INVENTION

1. Technical Field

The present invention relates to a system and method for adding multi-level security to federated assets. More particularly, the present invention relates to a system and method for filtering a composite taxonomy based upon user credentials and providing the filtered composite taxonomy to a portal, which the portal utilizes when generating a user interface view that includes nodes corresponding to federated assets in which the user is authorized to access.

2. Description of the Related Art

Asset repositories are software client and server systems that allow users to view, search, create, read, update, and delete assets. Assets may include, for example, documents, code fragments, install scripts, binary images, and other asset bundles. A system may "federate" repositories, which involves connecting multiple repositories together to share assets. Federation may also include providing a common client access point to the federated repositories, such as through a portal.

A computer system typically includes repositories that differ in their taxonomies, asset definitions and user access. Some repositories may include a "single-level" security access while other repositories may include a "multi-level" security access. A single-level security access repository provides a secure login mechanism that allows user access to all assets within that repository. This type of security level access is typical when the repository does not support fine-grained asset security to restrict view, search, create, read, update and delete operations. A multi-level security access repository provides multiple users and groups specific view, search, create, read, update and delete privileges. These repositories take into account factors such as which repository a user is accessing, from which geography the user is connecting, and repository usage patterns.

A challenge found, however, is an inability to federate multi-level security repositories with single-level security repositories. Existing art requires a user to individually log into each repository. Otherwise, the user may have access to an asset within a repository in which the user is not authorized.

SUMMARY

It has been discovered that the aforementioned challenges are resolved using a system and method for filtering a composite taxonomy based upon user credentials and providing the filtered composite taxonomy to a portal, which the portal utilizes when generating a user interface view that includes nodes corresponding to federated assets in which the user is authorized to access.

A multi-level security (MLS) manager receives normalized taxonomies from repository managers, which manage repositories that include assets that are assigned various security levels. For example, the repository managers may propagate their normalized taxonomies to the MLS manager at times according to policies and schedules that are defined by a system administrator. In turn, the MLS manager integrates the taxonomies into a composite taxonomy and stores the composite taxonomy in a Lightweight Directory Access Protocol (LDAP) directory.

When a portal receives a request from a user, the portal first authenticates the user using the MLS manager. Once authenticated, the portal sends a taxonomy request to the MLS manager that includes the user's user identifier. The MLS manager retrieves the composite taxonomy from the LDAP directory, identifies the user's security level, and filters the composite taxonomy based upon the user's security level.

The portal receives the filtered composite taxonomy from the MLS manager and generates a user interface view based upon the filtered composite taxonomy. The portal provides the user interface view to the user and, in turn, the user utilizes the user interface view to request and receive assets from one or more federated repositories.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 5 is an exemplary diagram showing another user interface view that a portal generates based upon a filtered composite taxonomy;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
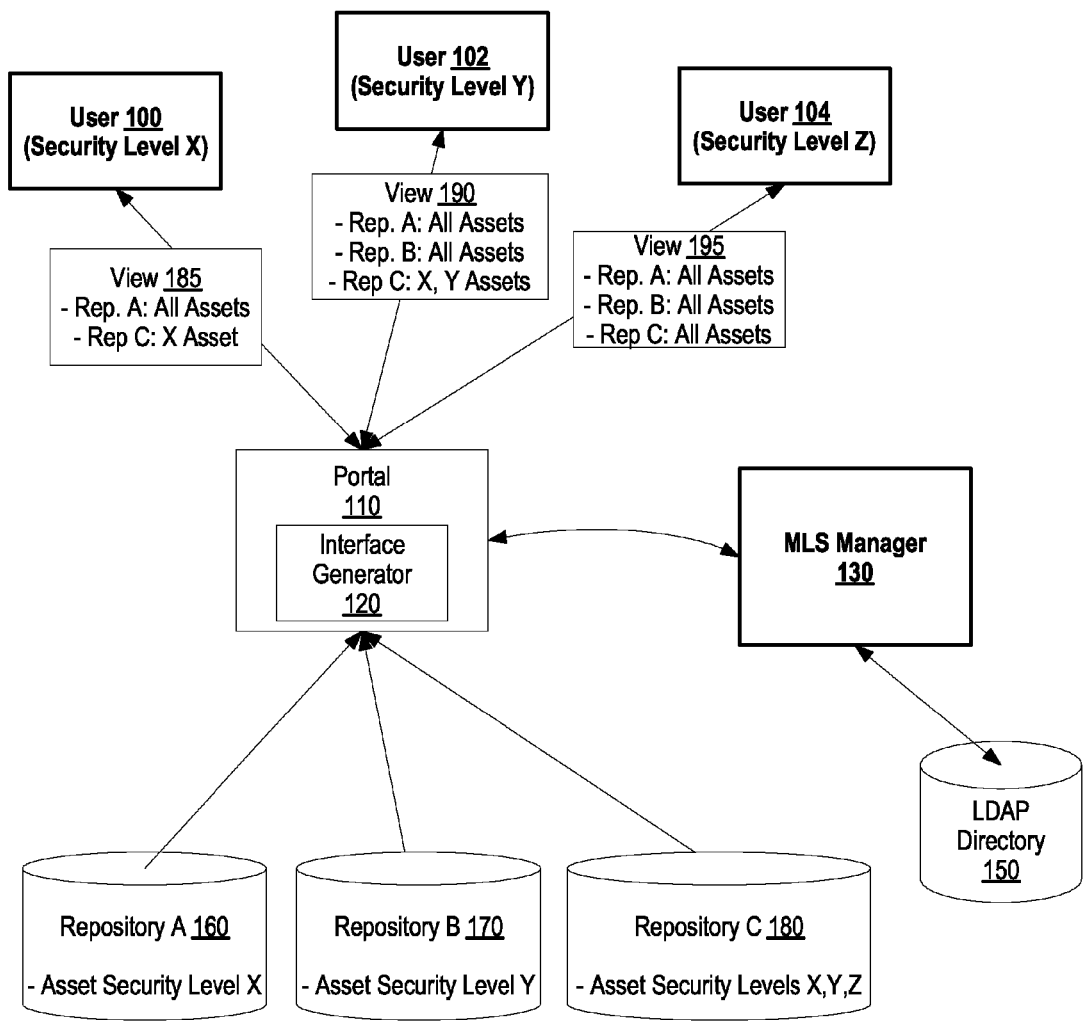
FIG. 1 is an exemplary high-level diagram showing a portal using filtered composite taxonomies to generate user interface views that are based upon a user's security level.

FIG. 1 is an exemplary high-level diagram showing a portal using filtered composite taxonomies to generate user interface views that are based upon a user's security level. Multi-level security (MLS) manager 130 filters a composite taxonomy based upon a user's security level, and provides the filtered composite taxonomy to portal 110. For example, when a user has a "Secret" security clearance, the filtered composite taxonomy includes nodes corresponding to assets that are classified "Confidential" and "Secret," but does not include nodes corresponding to assets that are classified "Top Secret." In turn, portal 110 uses the filtered composite taxonomy to generate a user interface view, which it provides to the user to retrieve assets.

MLS manager 130 receives normalized taxonomies from repository managers that manage repositories A 160, B 170, and C 180. For example, the repository managers may propagate their normalized taxonomies to MLS manager 130 at times according to policies and schedules that are defined by a system administrator. As can be seen, repository A 160 and repository B 170 are single-level security access repositories and repository C 180 is a multi-level security access repository. As discussed earlier and appreciated by those skilled in the art, a single-level security access repository provides a secure login mechanism that allows user access to all assets within that repository. This type of security level access is typical when the repository does not support fine-grained asset security to restrict view, search, create, read, update and delete operations. A multi-level security access repository provides multiple users and groups specific view, search, create, read, update and delete privileges. These repositories take into account factors such as which repository a user is accessing, from which geography the user is connecting, and repository usage patterns. In turn, MLS manager 130 integrates the normalized taxonomies into a composite taxonomy and stores the composite taxonomy in Lightweight Directory Access Protocol (LDAP) directory 150 (see FIG. 7 and corresponding text for further details).

Each of users 100-104 shown in FIG. 1 has different user credentials (e.g., security levels). User 100 has security level "X," user 102 has security level "Y," and user 104 has security level "Z." The example shown in FIG. 1 is based upon security level Z being the highest security level (e.g., Top Secret), security level Y being the next highest security level (e.g., Secret), and security level Z being the least security level (e.g., Confidential). As a result, user 104 is entitled access to assets that are classified at X, Y and Z security levels; user 102 is entitled access to assets that are classified at X and Y security levels; and user 100 is entitled access to assets that are classified at an X security level. In one embodiment, user credentials are not in a "hierarchical" manner, such as when a user has "A" and "C" clearance but does not have "B" clearance.

When portal 110 receives a request from user 100, portal 110 first authenticates user 100 using MLS manager 130. Once authenticated, portal 110 sends a taxonomy request to MLS manager 130 that includes user 100's user identifier. MLS manager 130 retrieves the composite taxonomy from LDAP directory 150, identifies user 100's security level, and filters the composite taxonomy based upon user 100's security level. Using the example shown in FIG. 1, since user 100 has an X security clearance, MLS manager 130 filters out nodes that are associated with assets that are classified at a Y or Z security level.

Portal 110 receives the filtered composite taxonomy from MLS manager 130, and generates a user interface view (view 185) using interface generator 120. Portal 110 provides view 185 to user 100, which includes nodes corresponding to assets included in repository A 160 as well as nodes that correspond to assets included in repository C 180 that have an X security classification. However, view 185 does not include nodes corresponding to assets included in repository B 170 since each of the assets are classified at a higher security level than user 100's security level, nor does view 185 include nodes corresponding to assets included in repository C 180 that have security classifications Y or Z. In turn, user 100 uses view 185 to request and receive assets from repository A 160 and repository C 180 (see FIG. 4 and corresponding text for further details).

When portal 110 receives a request from user 102, portal 110 and MLS manager 130 perform the same steps as discussed above, except this time MLS manager 130 filters the composite taxonomy based upon user 102's security level, which is a security level Y. As such, portal 110 generates view 190 and provides view 190 to user 102. View 190 includes nodes that corresponds to assets included in repository A 160, repository B 170, and assets included in repository C 180 that are classified at an X or a Y security level (see FIG. 5 and corresponding text for further details).

When portal 110 receives a request from user 104, portal 110 and MLS manager 130 perform the same steps as discussed above, except this time MLS manager 130 filters the composite taxonomy based upon user 104's security level, which is a security level Z. As such, portal 110 generates view 195 and provides view 195 to user 104. View 195 includes nodes that corresponds to assets included in repository A 160, repository B 170, and all assets included in repository C 180 (see FIG. 6 and corresponding text for further details).

Figure 2:
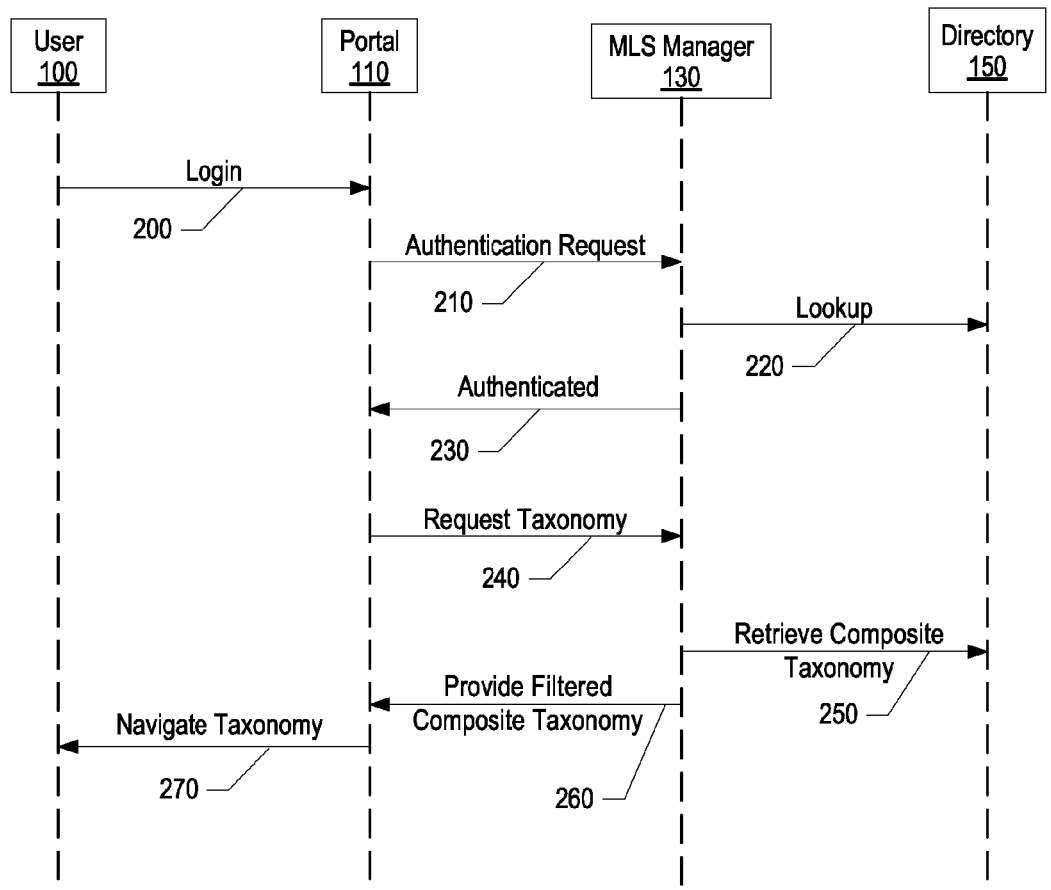
FIG. 2 is an exemplary diagram showing an MLS manager authenticating a user and generating a filtered composite taxonomy to a portal, which generates a corresponding user interface view in which the user navigates.

FIG. 2 is an exemplary diagram showing an MLS manager authenticating a user and generating a filtered composite taxonomy to a portal, which generates a corresponding user interface view in which the user navigates. User 100 sends login 200 to portal 110. Login 200 includes a user identifier that corresponds to user 100. In turn, portal 110 sends authentication request 210 to MLS manager 130 in order to authenticate user 100.

In order to authenticate user 100, MLS manager 130 looks up (220) the user in directory 150. In turn, MLS manager sends authentication response 230 to portal 110 informing portal 110 that user 100 is authenticated. Portal 110 sends taxonomy request 230 to MLS manager 130. MLS manager 130 retrieves a composite taxonomy from directory 150 (250), and creates a filtered composite taxonomy that includes nodes corresponding to federated assets in which user 100 is allowed access based upon user 100's security level. MLS manager 130 provides the filtered composite taxonomy (260) to portal 110 that, in turn, generates a user interface view for user 100 to navigate (270). User 100 selects nodes that are included in the user interface view in order to access a federated asset (see FIG. 3 and corresponding text for further details). User 100, portal 110, MLS manager 130, and directory 150 are the same as that shown in FIG. 1.

Figure 3:
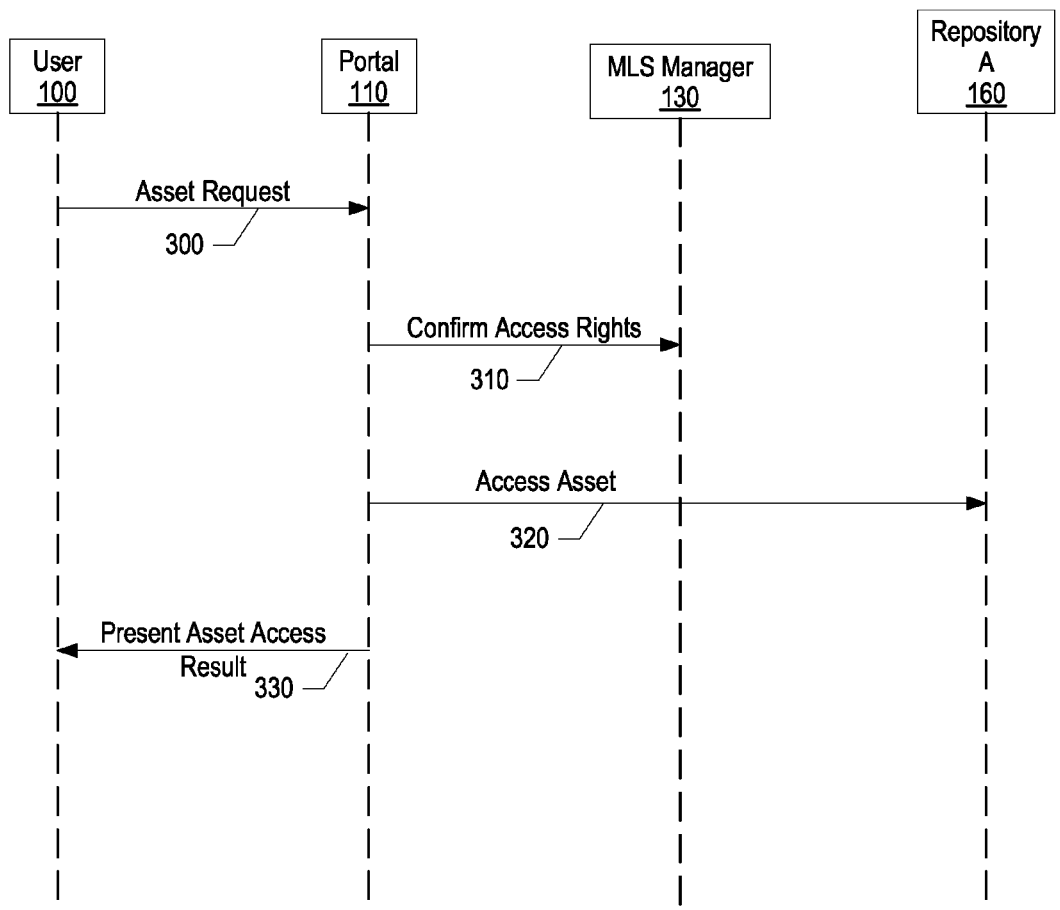
FIG. 3 is an exemplary diagram showing a user accessing a federated asset.

FIG. 3 is an exemplary diagram showing a user accessing a federated asset. User 100 sends asset request 300 to portal 110. For example, user 100 may select an available node that is shown in a user interface view, which corresponds to an asset that is located in repository A 160. Since the user interface view is created from a filtered composite taxonomy that was generated by MLS manager 130, the user 100 is allowed access to assets corresponding to the nodes that are presented in the user interface view. Portal 110 confirms user 100 access rights with MLS manager 130 (310). Once confirmed, portal 110 retrieves the asset (320) from repository A 160 and provides the asset (330) to user 100. User 100, portal 110, MLS manager 130, and repository A 160 are the same as that shown in FIG. 1.

Figure 4:
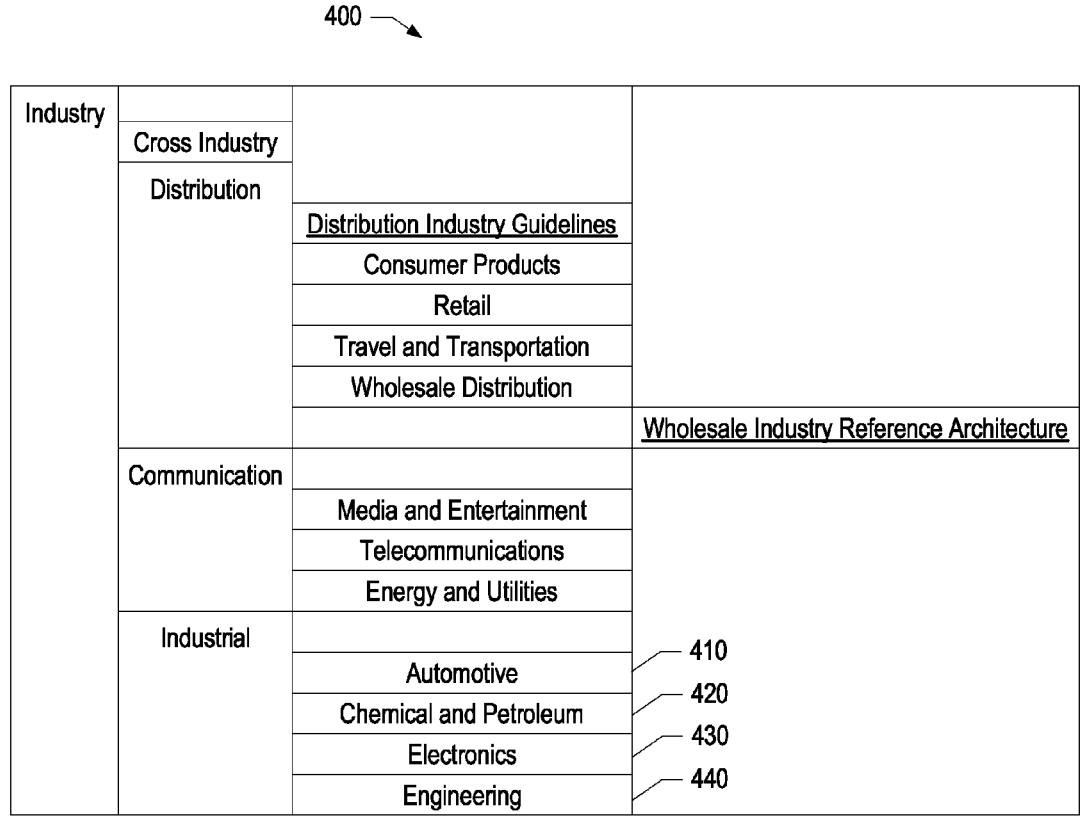
FIG. 4 is an exemplary diagram showing a user interface view that a portal generates based upon a filtered composite taxonomy.

FIG. 4 is an exemplary diagram showing a user interface view that a portal generates based upon a filtered composite taxonomy. A portal uses a filtered composite taxonomy to create user interface view 400, which includes nodes that correspond to assets located in federated repositories, such as repositories A 160, B 170, and C 180 shown in FIG. 1. View 400 is based upon a user's credentials, or security level, and includes nodes that correspond to assets that are available to the user based upon the user's security level.

View 400 includes nodes 410 though 440. View 400 does not include aerospace and defense nodes, such as those shown in FIGS. 4 and 5, because the user associated with view 400 does not have adequate security clearance.

FIG. 5 is a diagram showing another user interface view that a portal generates based upon a filtered composite taxonomy. View 500 includes more nodes than view 400 shown in FIG. 4 because the user associated with view 500 has a higher security clearance. As a result, view 500 presents nodes 510 and 520, which view 400 does not show, in addition to nodes 410 through 440. For example, a user that has a confidential security clearance may be viewing view 400, while a user that has a secret security clearance may be viewing view 500. Either view presents nodes that correspond to assets that are accessible by the particular user based upon each user's security clearance.

Figure 6:
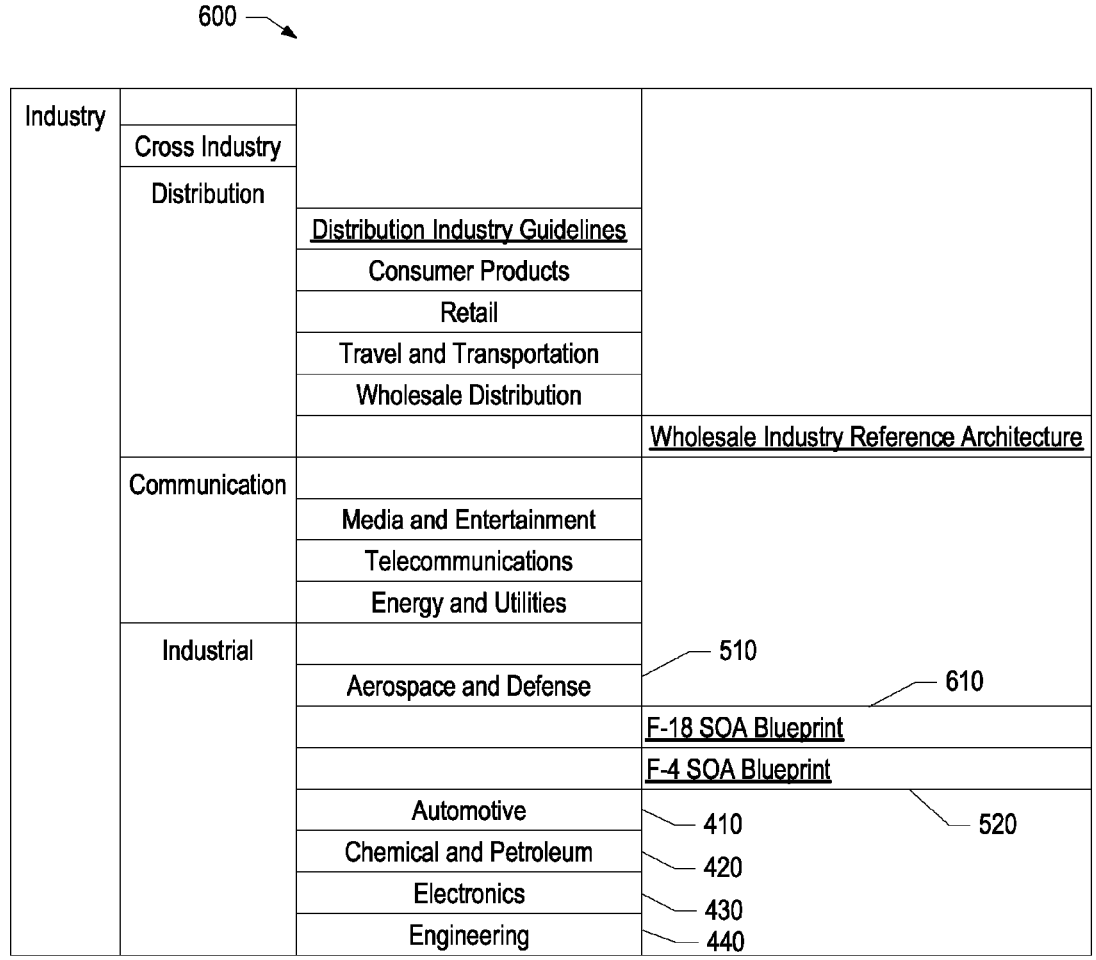
FIG. 6 is an exemplary diagram showing yet another user interface view that a portal generates based upon a filtered composite taxonomy.

FIG. 6 is an exemplary diagram showing yet another user interface view that a portal generates based upon a filtered composite taxonomy. View 600 includes more nodes than view 400 or view 500 because the user associated with view 600 has a higher security clearance than users associated with view 400 or view 500. As a result, view 600 presents node 610, which view 500 does not show, in addition to nodes 410 through 440 and 510 through 520. For example, a user that has a top secret security clearance may be viewing view 600, which allows the user to access a top secret blue print that users with a lesser security clearance are not able to view.

Figure 7:
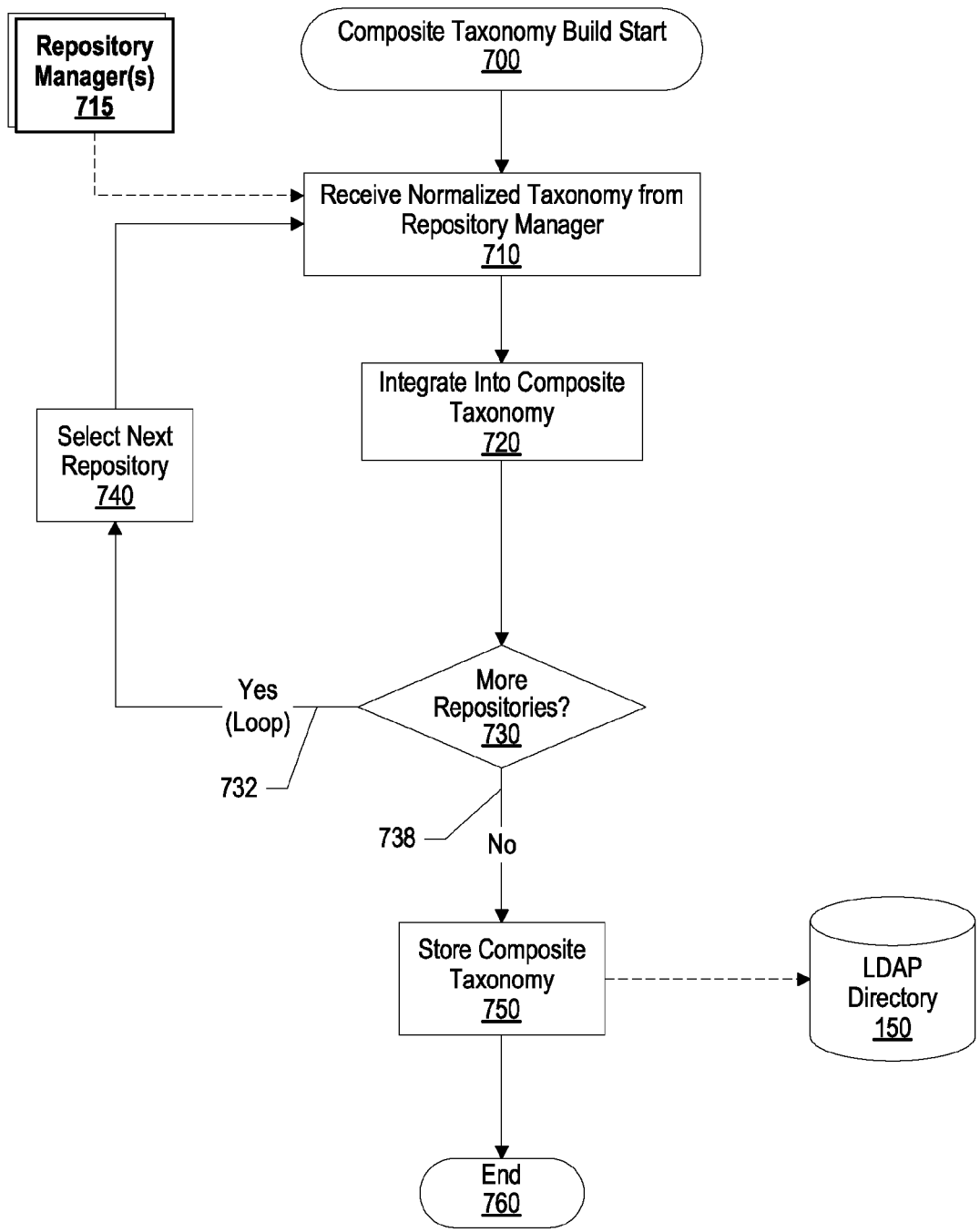
FIG. 7 is an exemplary flowchart showing steps taken in an MLS manager building a composite taxonomy using normalized taxonomies received from repository managers.

FIG. 7 is an exemplary flowchart showing steps taken in an MLS manager building a composite taxonomy using normalized taxonomies received from repository managers. Processing commences at 700, whereupon the MLS manager receives a normalized taxonomy from one of repository managers 715 (step 710). For example, repository managers 715 may propagate their normalized taxonomies to the MLS manager according to policies and schedules that are defined by a system administrator. At step 720, processing integrates the normalized taxonomy into a composite taxonomy. For example, a taxonomist who understands a current composite taxonomy may map equivalent classifications from a normalized taxonomy to classifications that exist in the composite taxonomy. If the normalized taxonomy includes classifications that do not have an equivalent classification in the composite taxonomy, the taxonomist extends the composite taxonomy with new classifications.

A determination is made as to whether there are more taxonomies to integrate (decision 730). If there are more taxonomies to integrate, decision 730 branches to "Yes" branch 732 whereupon processing selects the next repository manager 715 (step 740), and integrates the next normalized taxonomy. This looping continues until the MLS manager has integrated each of the repository mangers 715's taxonomies, at which point decision 730 branches to "No" branch 738 whereupon processing stores the composite taxonomy in LDAP store 150 for later retrieval (see FIG. 9 and corresponding text for further details). LDAP directory 150 is the same as that shown in FIG. 1. Processing ends at 760.

Figure 8:
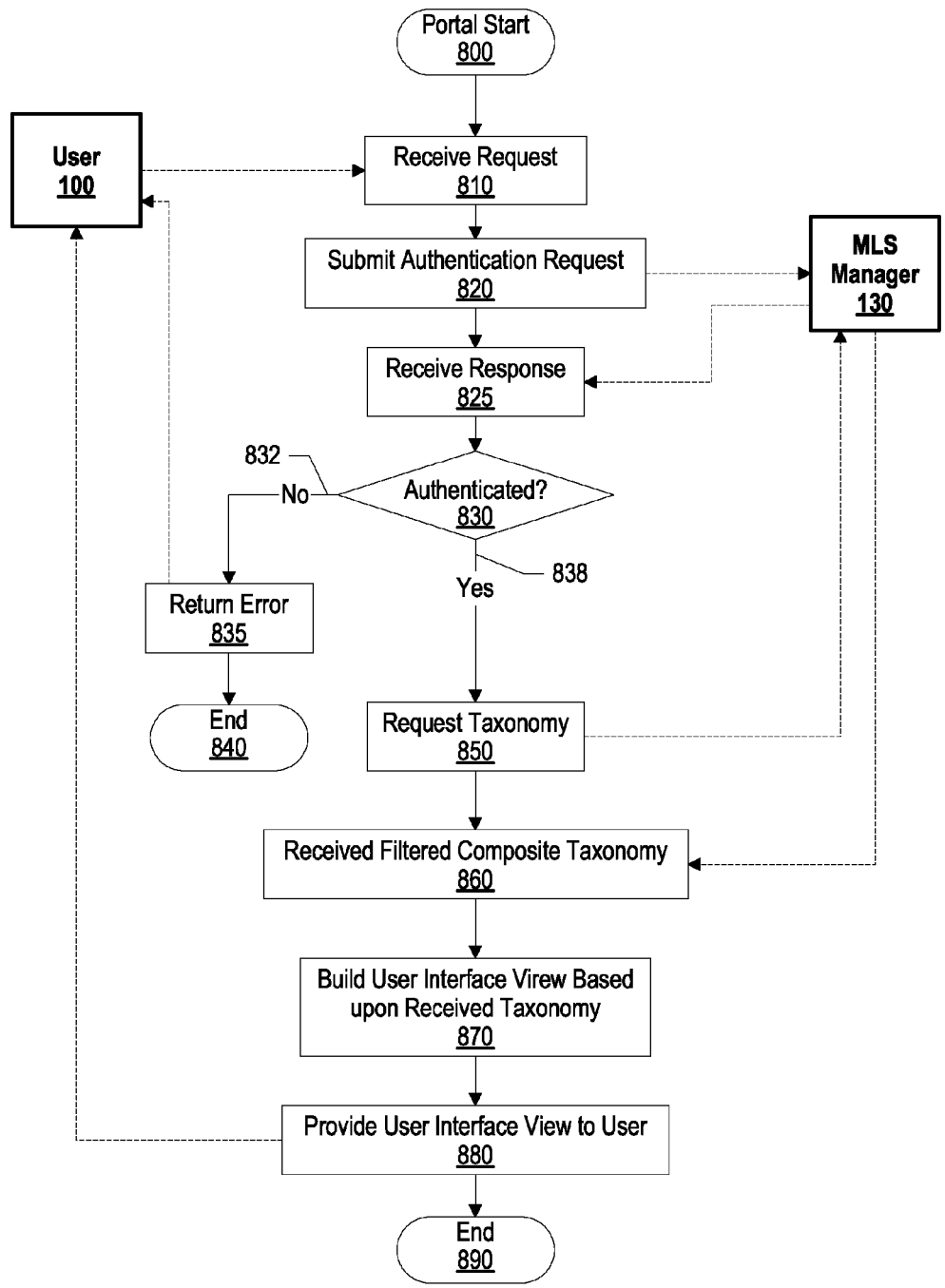
FIG. 8 is an exemplary flowchart showing steps taken in a portal interfacing with an MLS manager to authorize a user and receive a filtered composite taxonomy, which the portal utilizes to generate a user interface view to provide to the user.

FIG. 8 is an exemplary flowchart showing steps taken in a portal interfacing with an MLS manager to authorize a user and receive a filtered composite taxonomy, which the portal utilizes to generate a user interface view to provide to the user. Processing commences at 800, whereupon the portal receives a request form user 100 at step 810. At step 820, the portal submits an authentication request to MLS manager 130, which includes user 100's user identifier. User 100 and MLS manager 130 are the same as that shown in FIG. 1.

MLS manager 130 provides an authentication response from MLS manager 130 at step 825, and a determination is made as to whether user 100 is authenticated (decision 830). If user 100 is not authenticated, decision 830 branches to "No" branch 832 whereupon the portal returns an error to user 100 at step 835, and processing ends at 840.

On the other hand, if user 100 is authenticated, decision 830 branches to "Yes" branch 838 whereupon the portal requests a taxonomy for user 100 from MLS manager 130 (step 850). MLS manager generates a filtered composite taxonomy based upon user 100's security level and provides the filtered composite taxonomy to the portal at step 860 (see FIG. 7 and corresponding text for further details regarding filtered composite taxonomy generation).

The portal builds a user interface view based upon the received filtered composite taxonomy at step 870, such as those shown in FIGS. 4 through 6. At step 880, the portal provides the user interface view to user 100 for which user 100 navigates and selects an asset from a repository (see FIG. 9 and corresponding text for further details). Portal processing ends at 890.

Figure 9:
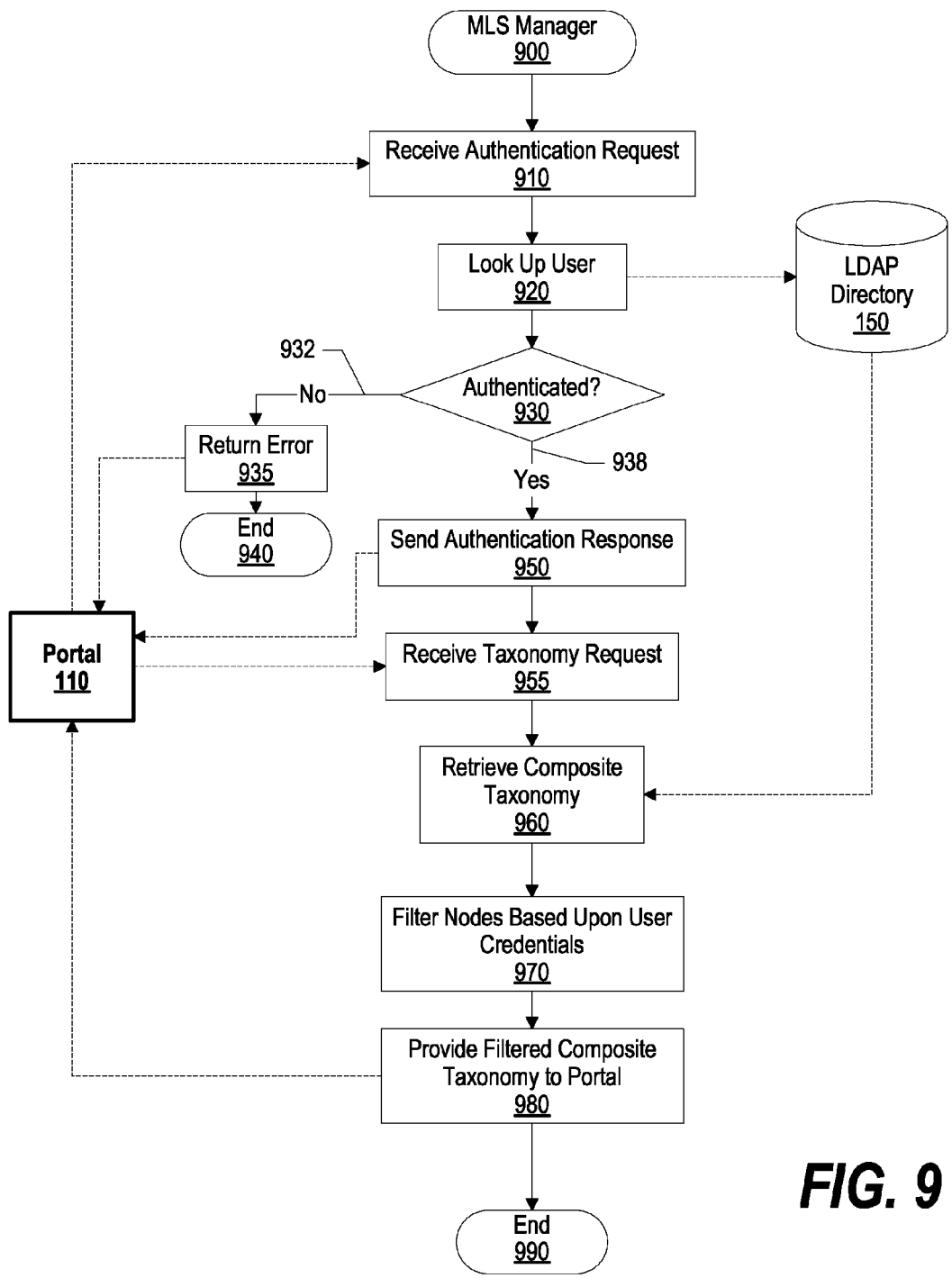
FIG. 9 is an exemplary flowchart showing steps taken in an MLS manager generating a filtered composite taxonomy in response to receiving an access request from a portal.

FIG. 9 is an exemplary flowchart showing steps taken in an MLS manager generating a filtered composite taxonomy in response to receiving an access request from a portal. Processing commences at 900, whereupon the MLS manager receives an authentication request, which includes a user identifier, from portal 110 at step 910. At step 920, the MLS manager looks up the user identifier in LDAP directory 150. Portal 110 and LDAP directory 150 are the same as that shown in FIG. 1.

A determination is made as to whether the user is authenticated (decision 930). If the user is not authenticated, decision 930 branches to "No" branch 932 whereupon processing returns an error to portal 110 at step 935, and processing ends at 940.

On the other hand, if the user is authenticated, decision 930 branches to "Yes" branch 938 whereupon the MLS manager sends an authentication response to portal 110 at step 950. At step 955, processing receives a taxonomy request from portal 110. The MLS manager, at step 960, retrieves a composite taxonomy from LDAP directory 150 that the MLS manager previously generated and stored (see FIG. 7 and corresponding text for further details). The MLS manager filters nodes included in the composite taxonomy based upon the user credentials (e.g., user security level) at step 970. For example, if the user has a "Confidential" security clearance, the MLS manager filters out nodes corresponding to assets with a higher security level, such as "Secret" and "Top Secret" documents.

The MLS manager provides the filtered composite taxonomy to portal at step 980, which portal 110 uses to generate a user interface view to provide to the user (see FIG. 8 and corresponding text for further details). MLS manager processing ends at 990.

Figure 10:
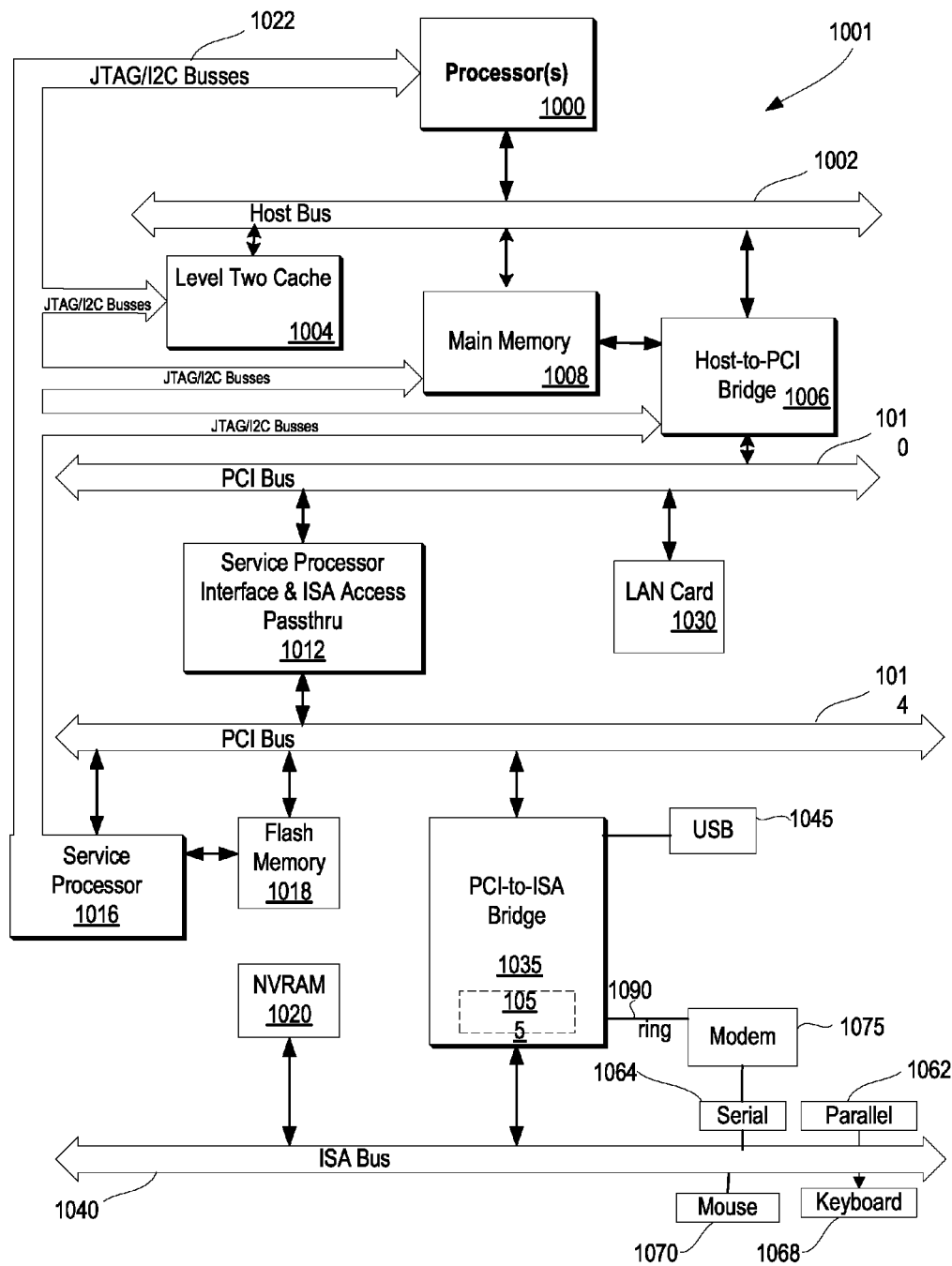
FIG. 10 is an exemplary block diagram of a computing device capable of implementing the present invention.

FIG. 10 an exemplary illustration of information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 10105 is connected to serial port 1064 and PCI-to-ISA Bridge 1035.

While FIG. 10 shows one information handling system that employs processor(s) 1000, the information handling system may take many forms. For example, information handling system 1001 may take the form of a desktop, server, portable, laptop, notebook, or other form factor computer or data processing system. Information handling system 1001 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving a first normalized taxonomy, the first normalized taxonomy corresponding to a first repository that has a single-level security access that provides a secure login mechanism on a per-repository basis;
    receiving a second normalized taxonomy, the second normalized taxonomy corresponding to a second repository that has a multi-level security access that provides a secure login mechanism on a per-asset basis;
    generating a composite taxonomy from the first normalized taxonomy and the second normalized taxonomy;
    storing the composite taxonomy in a storage area;
    receiving a taxonomy request from a portal, the taxonomy request including a user identifier;
    retrieving the composite taxonomy from the storage area in response to receiving the taxonomy request;
    identifying a user security level associated with the user identifier;
    filtering the composite taxonomy based upon the user security level, the filtering resulting in a filtered composite taxonomy that includes one or more available nodes that correspond to a subset of assets from a combination of assets included in the first repository and the second repository; and
    providing the filtered composite taxonomy to the portal.

2. The method of claim 1 further comprising:
    receiving the filtered composite taxonomy at the portal; and
    generating a user interface view at the portal based upon the filtered composite taxonomy, wherein the user interface view only includes nodes corresponding to the subset of assets from the combination of assets included in the first repository and the second repository.

3. The method of claim 1 wherein the user interface view includes a plurality of first nodes and a plurality of second nodes, the plurality of first nodes associated with the assets included in the first repository and the plurality of second nodes associated with only a portion of the assets included in the second repository.

4. The method of claim 3 further comprising:
receiving an asset request at the portal, the asset request corresponding to one of the plurality of second nodes;
confirming access rights for an asset that corresponds to the asset request; and
based upon the confirmation, providing access to the corresponding asset to the user.

5. The method of claim 1 further comprising:
receiving a different taxonomy request from the portal, the different taxonomy request corresponding to the first repository and the second repository;
identifying a different user security level associated with the different taxonomy request;
filtering the composite taxonomy based upon the different user security level, the filtering resulting in a different filtered composite taxonomy that includes one or more available nodes that correspond to a different subset of assets from the combination of assets included in the first repository and the second repository; and
providing the different filtered composite taxonomy to the portal.

6. The method of claim 1 wherein the first repository and the second repository are federated for sharing assets between the first repository and the second repository.

7. The method of claim 1 wherein the filtering further comprises removing one or more nodes that correspond to assets with a higher security level than the user security level.

8. A computer program product stored on a computer operable media, the computer operable media containing instructions for execution by a computer, which, when executed by the computer, cause the computer to implement a method of filtering a composite taxonomy, the method comprising:
receiving a first normalized taxonomy, the first normalized taxonomy corresponding to a first repository that has a single-level security access that provides a secure login mechanism on a per-repository basis;
receiving a second normalized taxonomy, the second normalized taxonomy corresponding to a second repository that has a multi-level security access that provides a secure login mechanism on a per-asset basis;
generating a composite taxonomy from the first normalized taxonomy and the second normalized taxonomy;
storing the composite taxonomy in a storage area;
receiving a taxonomy request from a portal, the taxonomy request including a user identifier;
retrieving the composite taxonomy from the storage area in response to receiving the taxonomy request;
identifying a user security level associated with the user identifier;
filtering the composite taxonomy based upon the user security level, the filtering resulting in a filtered composite taxonomy that includes one or more available nodes that correspond to a subset of assets from a combination of assets included in the first repository and the second repository; and
providing the filtered composite taxonomy to the portal.

9. The computer program product of claim 8 wherein the method further comprises:
receiving the filtered composite taxonomy at the portal; and
generating a user interface view at the portal based upon the filtered composite taxonomy, wherein the user interface view only includes nodes corresponding to the subset of assets from the combination of assets included in the first repository and the second repository.

10. The computer program product of claim 8 wherein the user interface view includes a plurality of first nodes and a plurality of second nodes, the plurality of first nodes associated with the assets included in the first repository and the plurality of second nodes associated with only a portion of the assets included in the second repository.

11. The computer program product of claim 10 wherein the method further comprises:
receiving an asset request at the portal, the asset request corresponding to one of the plurality of second nodes;
confirming access rights for an asset that corresponds to the asset request; and
based upon the confirmation, providing access to the corresponding asset to the user.

12. The computer program product of claim 8 wherein the method further comprises:
receiving a different taxonomy request from the portal, the different taxonomy request corresponding to the first repository and the second repository;
identifying a different user security level associated with the different taxonomy request;
filtering the composite taxonomy based upon the different user security level, the filtering resulting in a different filtered composite taxonomy that includes one or more available nodes that correspond to a different subset of assets from the combination of assets included in the first repository and the second repository; and
providing the different filtered composite taxonomy to the portal.

13. The computer program product of claim 8 wherein the first repository and the second repository are federated for sharing assets between the first repository and the second repository.

14. The computer program product of claim 8 wherein the filtering further comprises removing one or more nodes that correspond to assets with a higher security level than the user security level.

15. An information handling system comprising:
one or more processors;
a memory accessible by one or more of the processors;
one or more nonvolatile storage devices accessible by one or more of the processors; and
a set of instructions stored in the memory, wherein one or more processors execute the set of instructions in order to perform actions of:
receiving a first normalized taxonomy, the first normalized taxonomy corresponding to a first repository that has a single-level security access that provides a secure login mechanism on a per-repository basis;
receiving a second normalized taxonomy, the second normalized taxonomy corresponding to a second repository that has a multi-level security access that provides a secure login mechanism on a per-asset basis;
generating a composite taxonomy from the first normalized taxonomy and the second normalized taxonomy;
storing the composite taxonomy in one of the nonvolatile storage devices;
receiving a taxonomy request from a portal, the taxonomy request including a user identifier;

retrieving the composite taxonomy from one of the nonvolatile storage devices in response to receiving the taxonomy request;

identifying a user security level associated with the user identifier;

filtering the composite taxonomy based upon the user security level, the filtering resulting in a filtered composite taxonomy that includes one or more available nodes that correspond to a subset of assets from a combination of assets included in the first repository and the second repository; and providing the filtered composite taxonomy to the portal.

16. The information handling system of claim 15 further comprising an additional set of instructions in order to perform actions of:

receiving the filtered composite taxonomy at the portal; and generating a user interface view at the portal based upon the filtered composite taxonomy, wherein the user interface view only includes nodes corresponding to the subset of assets from the combination of assets included in the first repository and the second repository.

17. The information handling system of claim 15 wherein the user interface view includes a plurality of first nodes and a plurality of second nodes, the plurality of first nodes associated with the assets included in the first repository and the plurality of second nodes associated with only a portion of the assets included in the second repository.

18. The information handling system of claim 17 further comprising an additional set of instructions in order to perform actions of:

receiving an asset request at the portal, the asset request corresponding to one of the plurality of second nodes;

confirming access rights for an asset that corresponds to the asset request; and based upon the confirmation, providing access to the corresponding asset to the user.

19. The information handling system of claim 15 further comprising an additional set of instructions in order to perform actions of:

receiving a different taxonomy request from the portal, the different taxonomy request corresponding to the first repository and the second repository;

identifying a different user security level associated with the different taxonomy request;

filtering the composite taxonomy based upon the different user security level, the filtering resulting in a different filtered composite taxonomy that includes one or more available nodes that correspond to a different subset of assets from the combination of assets included in the first repository and the second repository; and providing the different filtered composite taxonomy to the portal.

20. The information handling system of claim 15 wherein the first repository and the second repository are federated for sharing assets between the first repository and the second repository.

* * * * *